United States Patent
Bozman et al.

(10) Patent No.: US 6,385,699 B1
(45) Date of Patent: May 7, 2002

(54) MANAGING AN OBJECT STORE BASED ON OBJECT REPLACEMENT PENALTIES AND REFERENCE PROBABILITIES

(75) Inventors: Gerald Parks Bozman, Oakland, NJ (US); John Timothy Robinson, Yorktown Heights; William Harold Tetzlaff, Mt. Kisco, both of NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/058,652

(22) Filed: Apr. 10, 1998

(51) Int. Cl.$^7$ ............................................. G06F 12/12

(52) U.S. Cl. .................... 711/133; 711/134; 711/136; 711/159; 709/217

(58) Field of Search ............................... 711/133, 134, 711/159, 135, 136; 709/214, 215, 216, 218, 213

(56) References Cited

U.S. PATENT DOCUMENTS

| | | | |
|---|---|---|---|
| 3,964,028 A | | 6/1976 | Belady et al. ............ 340/172.5 |
| 5,043,885 A | | 8/1991 | Robinson .................... 364/200 |
| 5,452,440 A | * | 9/1995 | Salsburg ..................... 711/136 |
| 5,572,643 A | | 11/1996 | Judson ........................ 395/793 |
| 5,692,185 A | | 11/1997 | Nilsen et al. ................ 395/615 |
| 5,701,451 A | | 12/1997 | Rogers et al. .............. 395/600 |
| 5,822,759 A | * | 10/1998 | Treynor ....................... 711/134 |
| 5,943,687 A | * | 8/1999 | Liedberg .................... 711/156 |
| 6,012,126 A | * | 1/2000 | Aggarwal et al. .......... 711/133 |
| 6,085,193 A | * | 7/2000 | Malkin et al. ................ 707/10 |

OTHER PUBLICATIONS

Reddy et al., "An Adaptive Mechanism for Web Browser Cache Management", IEEE Internet Computing, vol. 2, iss. 1, pp. 78–81, Feb. 1998.*

Kim et al., "Analysis of Buffer Replacement Policies for WWW Proxy", 12th International Conference on Information Networking, pp. 427–432, Jan. 1998.*

(List continued on next page.)

Primary Examiner—Do Hyun Yoo
Assistant Examiner—Gary J. Portka
(74) Attorney, Agent, or Firm—Gail H. Zarick; Anne Vachon Dougherty (57) ABSTRACT

A computerized method, system and computer program product for managing an object store is disclosed. An exemplary method includes the the steps of: collecting performance statistics about storage repositories from which an object(s) can be retrieved; retrieving an object from a storage repository, in response to an object reference; determining a reference probability (RFP) for the object; determining and associating a replacement penalty (RPP) with the object wherein the RPP is based on the one or more performance statistics and the RFP; and storing the object and an associated RPP for the object. The storage repositories could be locally attached devices, network sites, and/or remotely attached devices. If there is insufficient space in the object store for a new object, an object(s) can be replaced with the new object based on the associated RPP of the cached objects. Alternatively, the resolution of one or more objects in the object store can be reduced until sufficient space is available. The RPP determination is preferably based on the RFP for the object and performance and/or usage statistics. Examples of the performance statistics include: availability; size; latency; and bandwidth. An example of the usage statistics includes statistics on time delays (D) associated with abort requests made via the Internet, for example, using a browser. The RPP could include an annoyance function for a specific requester or set of requesters by instrumenting the browser STOP function and analyzing time interval statistics associated with its usage.

30 Claims, 7 Drawing Sheets

OTHER PUBLICATIONS

Reddy, "Effectiveness of Caching Policies for a Web Server", 4th International Conference on High–Performance Computing, pp. 94–99, Dec. 1997.*

Weidmann et al., "Soft Caching: Image Caching in a Rate–Distortion Framework", International Conference on Image Processing, vol. 2, pp. 696–699, Oct. 1997.*

Wooster, Roland et al. "Proxy Caching That Estimates Page Load Delays", Hyper Proceedings, Sixth International World Wide Web Conference, Apr. 7, 1997, pp. 1–12.

Johnson, D.W. et al., "Using the Overhead Costs of Network Messages to Choose Between Cache Coherency Strategies in a Distributed File System", IBM Technical Disclosure Bulletin vol. 34, No. 3, Aug., 1991, pp. 266–268.

Cao, Pei et al., "Cost–Aware WWW Proxy Caching Algorithms", Dec., 1997, Proc. 1997 USENIX Symp. Internet Technology and Systems, pp. 193–206.

Young, Neal et al., "On–Line File Caching", Jan., 1998 Proc. 9th Annual ACM–SIAM Symp. Discrete Algorithms, pp. 1–5.

Ronngren, Robert et al., "A Comparative Study of Parallel and Sequential Priority Queue Algorithms", ACM Transactions on Modeling and Computer Simulation, vol. 7, No. 2, Apr., 1997, pp. 157–209.

* cited by examiner

MANAGING AN OBJECT STORE BASED ON OBJECT REPLACEMENT PENALTIES AND REFERENCE PROBABILITIES

CROSS-REFERENCE TO RELATED PATENT APPLICATIONS

The present invention is related to co-pending patent application Ser. No. 08/958,506, by Challenger et al., filed Oct. 27, 1997, IBM Docket No. YO997321. This co-pending application and the present invention are commonly assigned to the International Business Machines Corporation, Armonk, N.Y. This co-pending application is hereby incorporated by reference in its entirety into the present application.

BACKGROUND

A paging system is a computer system in which the appearance of a large virtual memory is provided through a combination of high speed main memory and slower speed auxiliary memory. The first computer system to use paging was the Atlas machine (Sumner, T. K., *One Level Storage System,* IEEE Transactions on Computers, April 1962, pp. 223–235).

The original idea of a CPU managed memory hierarchy was introduced by Wilkes (Wilkes, M. V., *Slave Memories and Dynamic Storage Allocation,* IEEE Transactions on Electronic Computers, pp. 270–271, 1965). The key concept is that a small buffer of frequently referenced data can more quickly respond to fetch requests. Requests that are not in the buffer are fetched from main memory. A small amount of expensive high speed buffer can have a disproportionally good improvement on average access time. The first production computer with cache memory was the IBM 360 Model 85 (Liptay, J. S., *Structural aspects of the System/360 Model 85 II—The Cache,* IBM Systems Journal, 7, 1968, pp. 15–21 and Conti, C. J., *Concepts for buffer storage,* Computer Group News, 2, 1969, pp. 9–13).

Paging systems provide a memory cache of recently used pages and therefore can be considered a specific instance of a caching system. Both caching systems and paging systems require a dynamic mechanism for deciding which data to keep in the buffer. The decision hinges on which page to remove when a new candidate is to be inserted. It is frequently called the replacement algorithm.

The most often used replacement algorithm in computing systems is the Least Recently Used (LRU) algorithm (see Baylis, M. H., Fletcher, D. G., and Howarth, D. J., *Paging Studies on the I.C.T. Atlas Computer,* Proceedings of the IFIP Congress, pp. 831–837, 1968; Belady, L. A., *A Study of Replacement Algorithms for a Virtual-memory Computer,* IBM Systems Journal, 5, 1966, pp. 78–100; and U.S. Pat. No. 3,964,028, issued Jun. 15, 1976 to Belady et al.). In many cases the algorithm used is an LRU approximation that will operate with lower overhead. Belady showed that the optimal algorithm would replace the page with the longest time until next reference. However, this is not implementable. In general, replacement algorithms (LRU included) are trying to predict the next reference.

Effelsberg (Effelsberg, W., and Haerder, T., *Principles of Database Buffer Management,* ACM Transactions on Data Base Systems, 9, 1984, pp. 560–595) analyzed frequency based approaches. The frequency approach was later refined in U.S. Pat. No. 5,043,885, issued Aug. 27, 1991, entitled *Data Cache Using Dynamic Frequency Based Replacement and Boundary Criteria,* by Robinson). Frequency based algorithms place a higher value on frequently referenced blocks. This is another attempt at ranking blocks by the time of estimated next reference.

These paging and caching techniques have been incorporated into database buffer caches, file system buffer caches, and caches in disk control units. In all cases, LRU variants or frequency based replacement algorithms are used. The systems all share two important characteristics: first, all objects are the same size (or one of a small number of predetermined sizes); second, all blocks take approximately the same time to retrieve from the backing store. In these systems improvements to the replacement algorithm will result in higher hit ratios, lower miss ratios and reduced average latency.

Web page caching introduces two new deviations from previous automatic storage hierarchy systems. First, objects are of a wide range of different sizes. Second, the fetch time in the event of a miss is different (often very different due to network latency, server load and object size). The relaxation that allows variable fetch times and variable size decouples the relationship between hit ratio and average fetch time.

Average user fetch time is a reasonable objective function for the optimization problem for which the replacement algorithm is used. If objects are variable in size, then the fast buffer may be more effectively used for multiple small objects instead of one large object that is referenced more often than any one of the small objects. Long network latency to a particular object may make it a better candidate to retain in memory than other objects that are referenced more frequently but have lower miss penalties.

One proposed solution is a server centric system in which the server gives hints to clients about what to cache (see *Using the Overhead Costs of Network Messages to Choose Between Cache Coherency Strategies in a Distributed File System,* IBM Technical Disclosure Bulletin (TDB), pp. 266–268, (August 1991)). Here, the server decides whether to cache an item. The concern is the tradeoff, in network traffic, of invalidate messages versus more data movement when caching is not done. The TDB article does not make any proposal about which cacheable items should actually be cached. The TDB article makes use of a cost function (which are pervasive in optimizations) for making decisions.

The Hybrid algorithm uses a cost function that includes: time to connect to a server; bandwidth to the server; the number of times requested; and the size (see Wooster, R., and Abrams, M. *Proxy Caching That Estimates Page Load Delays,* 6th International World Wide Web Conference, Apr. 7–11, 1997, Santa Clara, Calif.). It also includes a number of tuning parameters that must be experimentally determined. The cost function should really be viewed as a heuristic because it is not dimensionally meaningfull (time is added to time divided by size). It does not use reference probabilities for evaluating a cost function.

The current state of the art is recognizing that size, retrieval time, and frequency of reference may play a role in replacement algorithms. However, at this time, it is only entering in empirically created decision functions. Thus, the need remains for an improved method and system for evaluating the relative value of cacheable objects. The need also remains for a method and system that makes use of reference probabilities in evaluating replacement costs. The present invention addresses these needs.

SUMMARY

In accordance with the aforementioned needs, the present invention is directed to a computerized method, system and program storage device for managing an object store, such as a cache, based on a replacement penalty.

An example of a method having features of the present invention includes the the steps of: collecting one or more performance statistics about one or more storage repositories from which one or more objects can be retrieved; retrieving an object from a storage repository, in response to an object reference; determining a reference probability for an object; determining and associating a replacement penalty with the object wherein the replacement penalty is based on the one or more performance statistics and the reference probability; and storing the object and an associated replacement penalty for the object. The storage repositories include but are not limited to locally attached devices, network sites, and/or remotely attached devices.

The replacement penalty of the present invention can be used to free storage, for example, by reducing the storage used by stored objects or replacing stored objects. An example of a method for reducing the storage used by stored objects includes the additional steps of: receiving a new object reference to a new object, not in the object store; retrieving an object from a storage repository, in response to an object reference; determining there is insufficient free space in the object store for the new object; and reducing the resolution of one or more objects in the object store until sufficient space is available to store the new object; and storing the new object and an associated replacement penalty for the new object.

An example of a method for cache replacement according to the present invention includes the steps of: collecting one or more performance statistics about one or more storage repositories from which one or more objects can be retrieved; estimating a reference probability for the one or more objects; receiving an object reference to an object not in the object store; retrieving an object from a storage repository, in response to receiving the object reference; determining there is insufficient free space in the object store for the new object; and replacing one or more objects in the object store, the sum of the sizes of which is equal to or greater than the size of the new object, with the new object based on the associated replacement penalty of the one or more cached objects; wherein the replacement penalty is based on the one or more performance statistics and the reference probability.

The present invention also has features for prioritizing the objects based on the associated replacement penalty of the one or more cached objects; and replacing the one or more cached objects having a minimum associated replacement penalty priority.

The present invention has other features for determining a reference probability, including the steps of: associating and maintaining a least recently used (LRU) list of records corresponding to objects in the object store; partitioning the LRU list into a number of sections; inserting a record associated with a most recently referenced object at a head of the LRU list, in response to said storing step; and maintaining object reference probability statistics for a set of objects in each section of the LRU.

The present invention also has features wherein maintaining the object reference probability statistics further includes the steps of: incrementing a reference count N(i) for a section i if an object currently in said section i is referenced; wherein the probability (P) that an object in said section i will be referenced is: P (reference to object in section i)=N(i)/(O(i)×T), wherein O(i) represents the number of objects in said section i, and T represents a total number of references for all sections. The replacement penalty can be recalculated each time a change is made to the set of objects in any section of the LRU, based on the reference probability specific to that section.

The replacement penalty (R) determination is preferably based on the reference probability (P) for the object and performance and/or usage statistics. An example of the performance statistics includes: an availability of the object (A); a size of the object (S); a latency associated with retrieving the object from a storage repository (L); or a bandwidth of the path to the storage repository (B).

An example of the usage statistics includes statistics on time delays (D) associated with abort requests. For example, in a system including a browser for retrieving objects via the Internet, the replacement penalty could factor in an annoyance function for a specific requester or set of requesters by instrumenting the browser STOP (also called Abort) function and analyzing time interval statistics associated with usage of the STOP function.

BRIEF DESCRIPTION OF THE DRAWINGS

These and other features and advantages of the present invention will become apparent from the following detailed description, taken in conjunction with the accompanying drawings, wherein.

DETAILED DESCRIPTION

Figure 1:
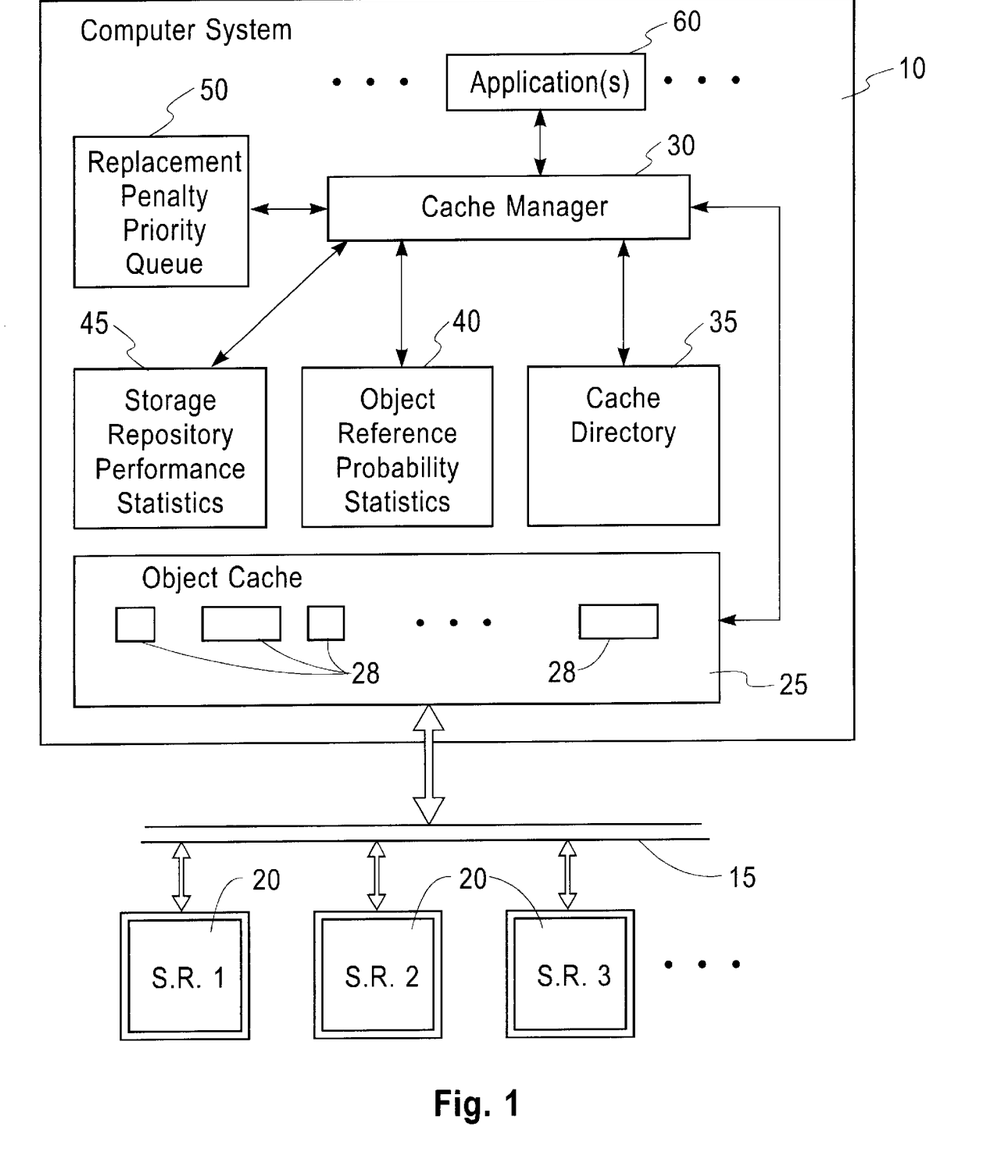
FIG. 1 depicts an example, in a block diagram form, of a computer system and a number of storage repositories having features of the present invention.

FIG. 1 depicts an example, in a block diagram form, of a computer system 10 and a number of storage repositories 20 having features of the present invention. As depicted, the computer system 10 is connected by means of a channel and/or network 15 to one or more storage repositories 20. The storage repositories 20 could be local or remote devices, network sites, or in general any type of object store in which data objects, identified by means of addresses or names, can be stored and retrieved by a computer system.

As is conventional, part of the memory of the computer system 10 is used as a cache 25 containing copies of some number of previously accessed objects (below, simply objects). Examples of objects include but are not limited to: disk blocks; file system blocks; entire files; HTML pages; text strings; images (of various types); audio segments (of various types); video clips (of various types); applets; and servlets. Also as is conventional, a cache manager 30 is used by one or more applications 60 running on the computer system 10 to determine if a copy of an object 28 required by an application resides in the cache 25. The cache manager determines this using a cache directory 35, which is used to record the current contents of the cache 25 at any point in time. When it is determined that a copy of an object not currently in the cache 25 should be stored in the cache, and there is insufficient space to store the new object, one or more of the objects 28 currently in the cache (25) must be replaced in order to create the space necessary to store the new object. This determination of objects to replace is made by the cache manager 30.

The present invention has features that can be embodied as software, tangibly embodied on a conventional computer program product or program storage device. As is conventional, the software comprises program instructions executable in some form, (e.g., interpreted or compiled for execution) on the computer system 10. For example, as will be described in detail below, the present invention has features which can be (embodied as software) included as part of, or that will work in conjunction with the cache manager 30.

The present invention can be used as part of a cache replacement determination to advantageously minimize a replacement penalty associated with deleting an object 28 from the cache 25. Referring again to the example depicted in FIG. 1, this determination can be made by a cache manager (30) adapted according to the present invention to use: (1) information about the objects (28) that may be selected for replacement as found in the cache directory 35; (2) object reference probability statistics 40; (3) storage repository performance statistics 45; and (4) a replacement penalty priority queue 50. Furthermore, the cache manager 30 may make use of usage statistics, derived for example from measurements of end-user patterns, in order to evaluate replacement penalties.

Figure 2A:
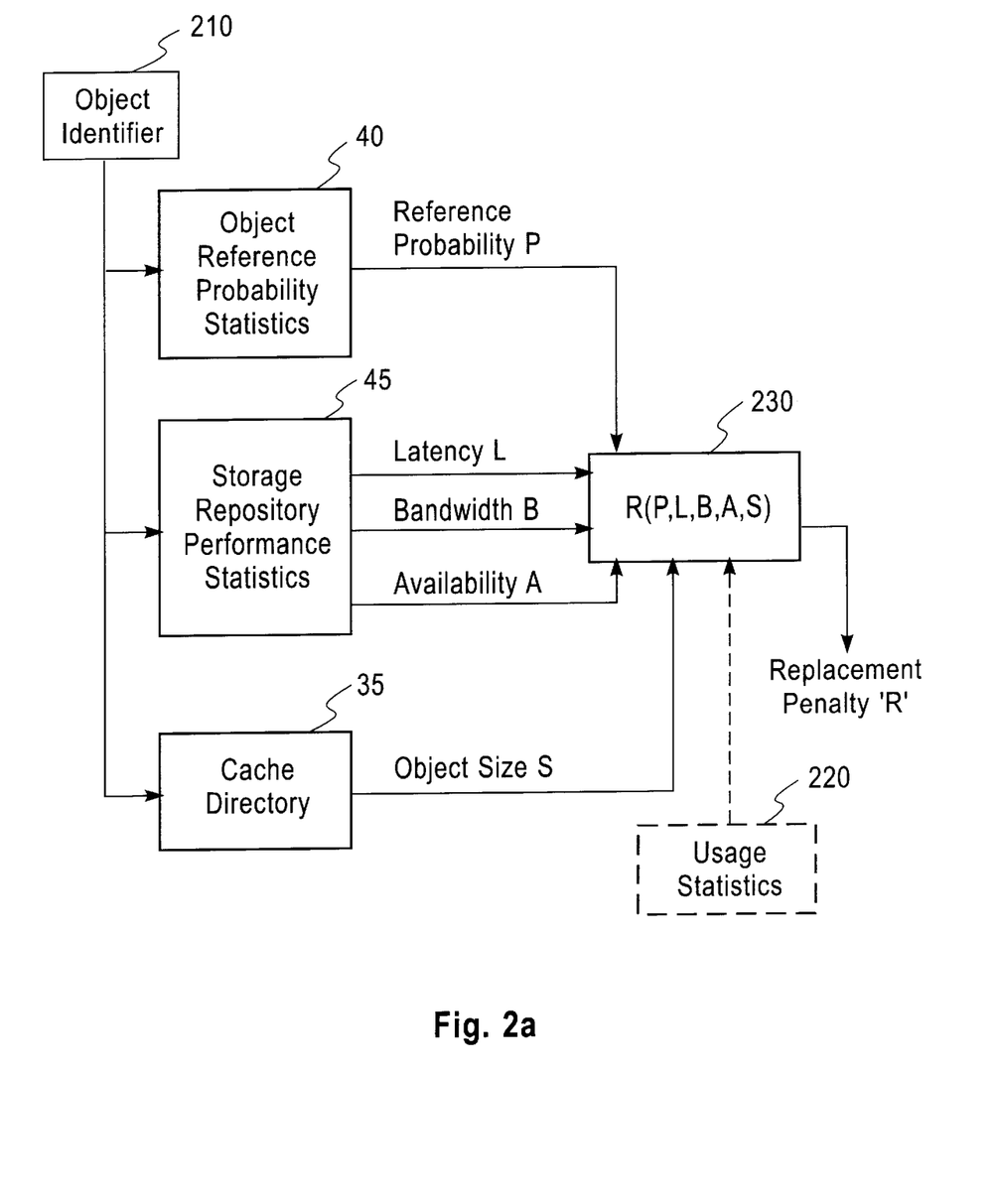
FIG. 2a depicts an example, in a block diagram form, of components that can be used to evaluate replacement penalties according to the present invention.

FIG. 2a depicts an example, in a block diagram form, of components that can be used to evaluate replacement penalties for an object 28 in the cache 25. As depicted, an object identifier 210 (of an object 28) is used to estimate a reference probability P based on object reference probability statistics 40. The average latency L, bandwidth B, and availability A of the storage repository from which the object was retrieved are determined from storage repository performance statistics 45. These particular statistics are given as examples; other statistics or statistics in addition to these could also be used. For example, the variance of the latency and bandwidth statistics for each storage repository 20 could also be used in evaluating replacement penalties. The object size S is found from the cache directory 35. These various quantities are used to evaluate a replacement penalty R(P,L,B,A, S) for the object 28 in a replacement penalty evaluator 230. If usage statistics are used in evaluating replacement penalties, they can be collected by means of a usage statistics collector 220 and also used as input to the replacement penalty evaluator.

In the case that a storage repository is a locally attached device of a known type, for example a given model disk storage unit, the storage repository performance characteristics may be known beforehand. For example, in the case of a given model disk storage unit, the known device characteristics can include the disk bandwidth, average seek time, and average rotational delay. In this case statistics collection may not be necessary, since the storage repository performance statistics could be set using the known device characteristics. For example, in the case of a given model disk storage unit, the availability could be set to one (that is, we assume the locally attached device is always available), the latency could be set to the sum of the average seek time and average rotational delay, and the bandwidth could be set to the known disk bandwidth for the given model of disk.

In other cases, for example when the device is remotely attached, or for the case of a network site, performance statistics can be collected in the following typical fashion. Consider the case of a network site N. When a connect request is made to N, the current system clock time T1 is read. When the connect request completes, the clock time T2 is again read; a connect request counter for N, C_count(N), is incremented, and a running total of connect times for N, C_time(N), is updated by C_time(N)=C_time(N)+T2−T1. The average latency for N is then updated by L(N)=C_time(N)/C_count(N). If however the connect request timed out, then instead: a connect failure counter for N, F_count(N), is incremented; C count(N) is incremented as before; and the availability of N is updated by A(N)=(C_count(N)−F_count(N))/C_count(N). Assuming the connect request succeeded, and that X bytes of data were subsequently transferred, then at the end of this transfer the clock time T3 is again read. Then, a running total of bytes of data transferred from N, X_total(N), is updated by X_total(N)=X_total(N)+X; next, a running total of data transfer times from N T_total(N), is updated by T_total(N)=T total(N)+T3−T2; finally, the average bandwidth for data transfers from N, B(N), is updated by B(N)=X_total(N)/T_total(N). Those skilled in the art will appreciate that within the spirit and scope of the present invention, the typical performance statistics collection as just described can be modified so as to give more weight to more recent statistics using standard techniques.

Some examples of the computation of replacement penalties by the replacement penalty evaluator 230 are as follows. In each example, P, L, B, A, and S are as in the previous discussion. First, disregarding availability, the time to retrieve an object is L+SIB, and the probability that this will be necessary is P. Therefore, the expected cost, in seconds of response time for example, for replacing the object is P×(L+S/B). However, the benefit of selecting the object for replacement is proportional to its size (that is, the larger the object, the more cache space is made free when it is selected for replacement). Therefore, an appropriate penalty measure is the cost/benefit ratio, which in this example is:

$$R(P,L,B,A,S)=P\times(L+S/B)/S.$$

Next, consider use of the availability measure A, which was not used in the previous example. If a storage repository is unavailable, it could potentially be a relatively long time before it becomes available again. Let W be the average waiting time (either found from statistics or estimated from experience) before an unavailable storage repository becomes available. Then extending the previous example, the replacement penalty could be evaluated as:

$$(R,L,B,A,S)=P\times((1-A)\times W \div A\times(L+S/B))/S.$$

The previous example is not realistic in certain cases. In particular, an end-user may "give up" after a certain delay in response time, that is, abort the current request. Statistics on time delays associated with abort requests can be collected, and used to construct a "user annoyance" function U. For example, suppose usage statistics indicate that on the average, a given user issues an abort request after a 30 second delay. Define the value 1 as "maximum annoyance", and assume the annoyance increases linearly with delay time up to the maximum. The function U(D), where D is the delay time, would then be defined as follows: U(D)=D/30 for D (in seconds) less than 30, and U(D)=1 for D greater than or equal to 30. The use of this function in computing replacement penalties has two implications: first, if a storage repository is unavailable then the maximum cost is assumed; second, if the retrieval time is any value larger than 30 seconds (in the case of this example), the maximum cost is again assumed. Using this example "user annoyance" function, the replacement penalty would be computed as follows (remembering that the maximum value of the function U is 1):

$$R(P,L,B,A,S)=P\times((1-A)\times 1+A\times U(L+S/B)/S.$$

Figure 2B:
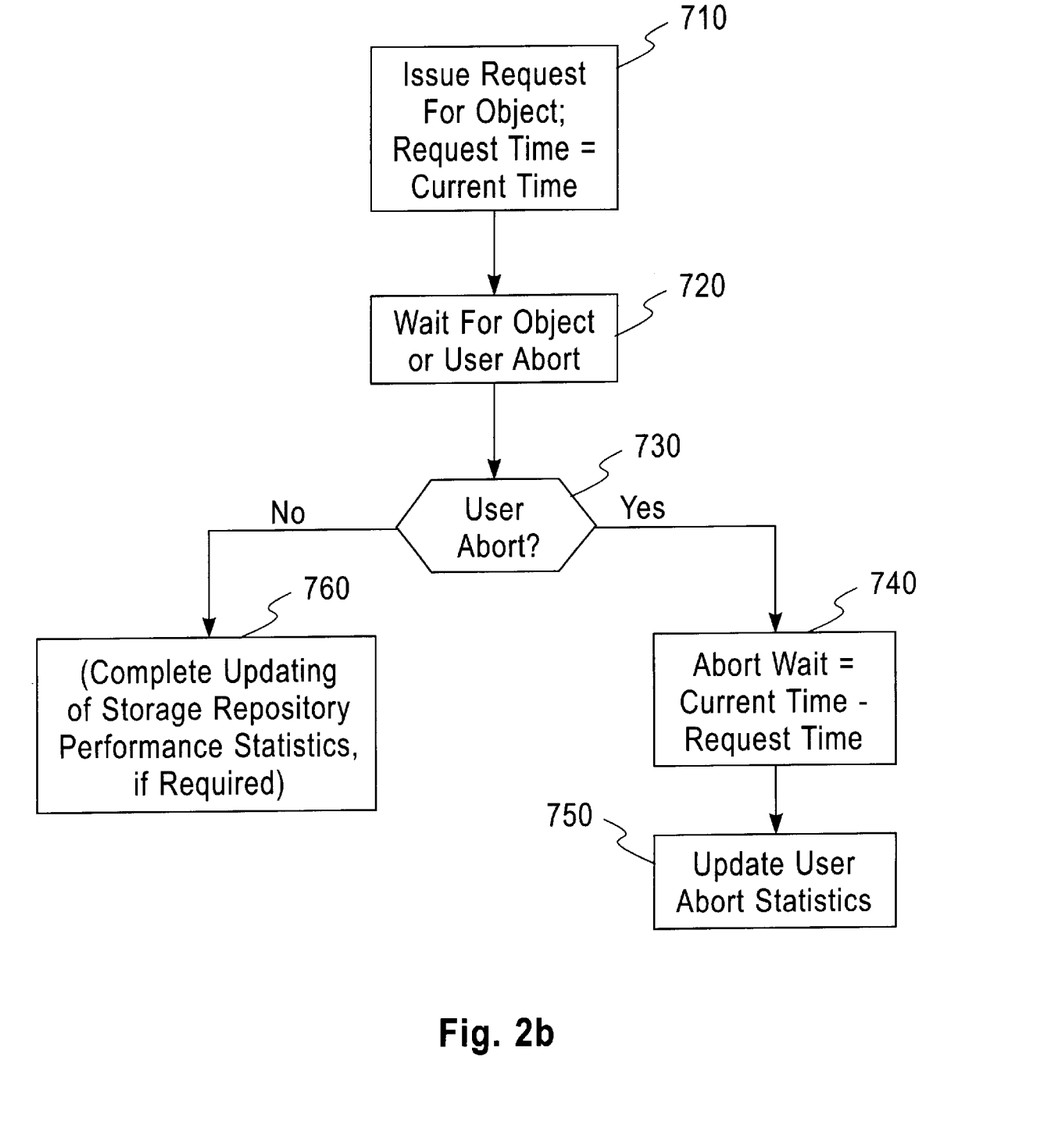
FIG. 2b depicts an example of collection of usage statistics associated with user initiated abort requests.

FIG. 2b illustrates an example of the collection of user abort statistics. As depicted, in step 710 the time that a request is made for an object in a storage repository is saved. In step 720, when the wait for the object to be returned by the storage repository is interrupted, a determination is made as to whether the wait was terminated by a user initiated abort or the arrival of the object in step 730. If the user initiated an abort, the time interval between the abort and the request for the object is computed in step 740. In step 750, the time the user waited before aborting and the number of user initiated aborts is incremented so that the average time the user waited before aborting can be computed. Those skilled in the art will appreciate that the average user wait time before issuing an abort requests can be maintained using conventional techniques, e.g., analogous to the storage repository performance statistics described herein before. In step 730, if the wait was interrupted by the arrival of the object from the storage repository, then updating the storage repository statistics is completed, in step 760 (e.g., as described above), if required (that is if the storage repository performance statistics have not been pre-set, also as described above).

For example, the system 10 could include a conventional browser having a STOP function which has been instrumented to compute the annoyance function for a specific requester or set of requesters using the STOP function and analyze the time interval statistics associated with usage of the STOP function.

An alternative for replacing an object is to reduce its resolution (in the case of objects that can be represented at various resolution levels), as described in commonly assigned co-pending U.S. patent application, Ser. No. 08/023,793, entitled Increasing Effective Cache Space by Means of Low Resolution Images, by La Maire et al., filed Feb. 13, 1998, IBM Docket No. YO997-308, which is hereby incorporated by reference in its entirety. In this case the above formulas would be modified as follows: let S1 be the size of the current resolution version of the object; let S2 be the size of the reduced resolution version; then the denominator S above would be replaced by S1–S2. Furthermore, in this case, the probability of reference would be interpreted to mean the probability that the higher resolution version would be required.

In order to calculate the replacement penalty for replacing an object 28, an estimate of the reference probability P for the object 28 is necessary for embodiments of the present invention.

Figure 3:
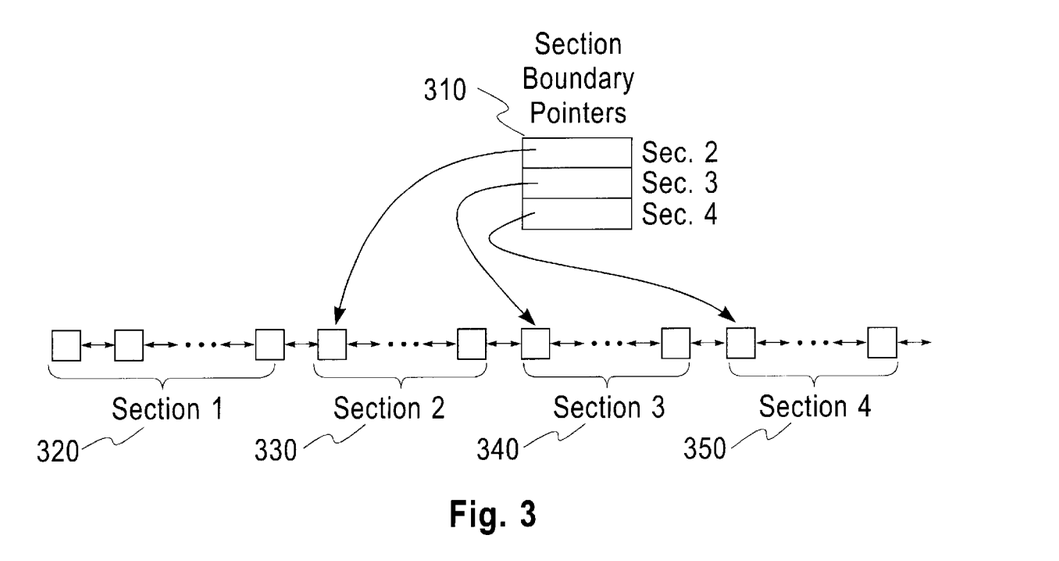
FIG. 3 shows an example of a data structure that can be used as an object reference history list (ORHL)

FIG. 3 depicts an example of a method for estimating reference probabilities based on an object reference history list (ORHL). As depicted, a doubly-linked LRU list is maintained in the usual way with a record referring to the most recently referenced object at the head and a record referring to the least recently referenced object at the tail. This list is not directly used for replacement as is typically done in cache implementations. Rather it is partitioned into n sections, where n for example could be a small integer on the order of 4 or 5. Various partitioning schemes can be used but for sake of discussion we shall assume that each section is of the same size and has a fraction 1/n of the total number of records in the list. If a partitioning scheme is used where there are an unequal number of records in each section then a count of the number of objects in each section must be maintained. By way of example only, the total number of records in the example list shown in FIG. 3 is divided into 4 sections. Each section contains ¼ of the total number of records in the list. The first section 320 contains records referring to the most recently referenced objects, the second section 330 contains records referring to the next most recently referenced, the third section 340 contains records referring to the next most recently referenced after section 2, and the last section 350 contains records referring to the least recently referenced objects.

Figure 4:
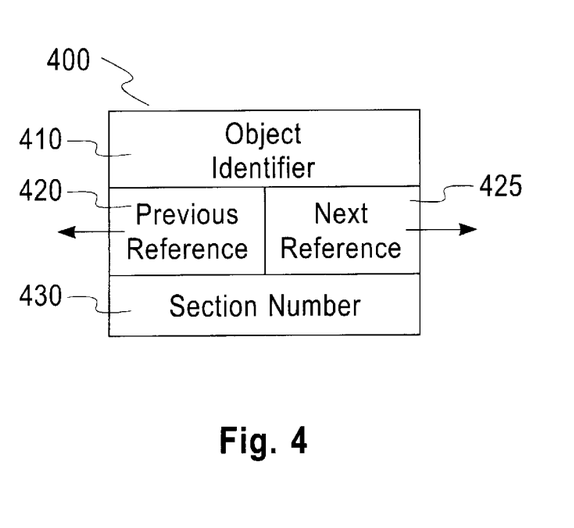
FIG. 4 shows example fields of an object reference history record that can be used an element of the object reference history list.

FIG. 4 shows an example of an object reference history record for each entry in the LRU list. As depicted, the object reference history record 400 includes: an object identifier 410; LRU pointers 420 and 425; and a section number 430 which is the number of the section (FIG. 3) in which the object it represents, currently resides. The partitioning into sections is accomplished by keeping pointers to boundary objects 310. Each time there is a reference to an object having a corresponding record in the ORHL (that is not already in section 1), x records move to new sections, where x is the section number of the referenced object. For example, if the record corresponding to the referenced object is currently in section 3 then 3 records will be moved to new sections: the record corresponding to the referenced object is moved to section 1; the record referring to the least recently referenced object in section 1 is moved to section 2; and the record referring to the least recently referenced object in section 2 is moved to section 3. The section boundary movement can be accomplished by adjusting the boundary pointers 310 and setting the section numbers 430 in the records. After this movement, all of the sections contain the same number of records as they did before the reference and only the 3 records that changed sections have their section number 430 changed. In addition, the LRU pointers 420, 425 for the records 400 not merely shifting across boundaries (for example, from Section 3 to Section 1) also need to be updated.

The number of records in the object reference history list is likely to be constrained by storage availability. Therefore, when the list reaches its maximum size, inserting a new record at the head of this list will involve removing the record at the tail of the list. If the removed record represents an object that is currently in the cache then it is desirable to ensure that the object can eventually be selected for replacement. There are a number of ways to accomplish this. One technique would be to set this object's reference probability to zero and then remove and reinsert it in the replacement penalty priority queue (described in more detail below) which will cause it to become immediately eligible for replacement. Another technique would be to move the replacement probability for this object to an "aging" structure which is simply a list containing records for the objects that have been removed from the object reference history list but are still in the cache. If the cache object is referenced during the period that the object's record is in the aging structure, its record would be removed from the aging structure and a record for the object would again be placed in the object reference history list. The aging structure would be periodically scanned and a function applied to reduce each record's reference probability. An example of such a function would be to reduce the reference probability through division by a value greater than one, for example division by two. The new reference probability would then be used to reposition the object's record in the replacement penalty priority queue. In this way continued absence of references to the object would cause the estimate of its reference probability to continue to decrease, which would in turn guarantee that it would eventually be replaced.

Figure 5:
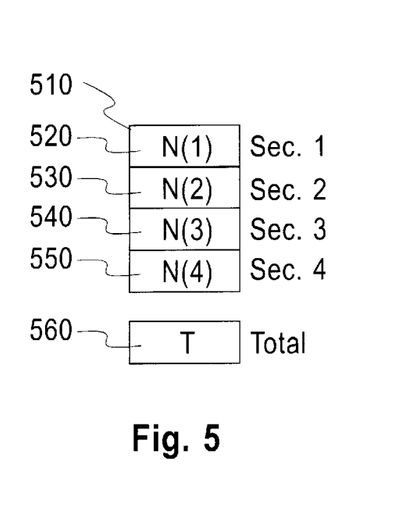
FIG. 5 illustrates example object reference statistics that could be collected in order to evaluate reference probabilities.

FIG. 5 illustrates an example of an object reference probability statistics 510 data structure that could be used to evaluate reference probabilities using an LRU list partitioning method. As depicted, a reference count N is maintained for each Section (SEC. 1 . . . SEC. i) N(i) and is incremented whenever an object currently in that Section (see FIG. 3) is referenced: N(1) 520 is the count for section 1 320; N(2) 530 is the count for section 2 330; N(3) 540 is the count for section 3 340; and N(4) 550 is the count for section 4 350. Therefore the probability (P) that an object in section i will be referenced is N(i), the reference count for section i, divided by O(i), the number of objects in section i, times the total T number of references 560.

$$P(\text{reference to object in section } i) = N(i)/(O(i) \times T)$$

Each time a record in the ORHL FIG. 3) referring to an object 28 in the cache 25 is placed in a new Section (320 . . . 350 . . . ): its replacement penalty R (FIG. 2a) is recalculated based on the reference probability P specific to that Section (FIG. 5); and a pointer to the object is preferably maintained in a separate structure, the replacement penalty priority queue (RPPQ) 50 (an example of which is described with reference to FIG. 6 below), which is effectively sorted by replacement penalty. (In the case that an aging structure is used, as previously described, the recalculation of the replacement penalty also applies to an object referenced by a record in the aging structure when the reference probability P for the object 28 is reduced.) The replacement penalty priority queue (RPPQ) 50 has the same functional and performance requirements as a priority queue (e.g., an event queue in a simulation system) and the various well known techniques used in that domain can be applied here. Priority queues use well known structures such as heaps and splay trees. A recent survey paper on these techniques is: *A Comparative Study of Parallel and Sequential Priory Queue Algorithms,* Ronngren and Ayani, ACM Transactions on Modeling and Computer Simulation, Vol 7, No. 2, pp. 157–209 (April 1997) ("Ronngren and Ayani"), which is hereby incorporated herein by reference in its entirety.

Figure 6A:
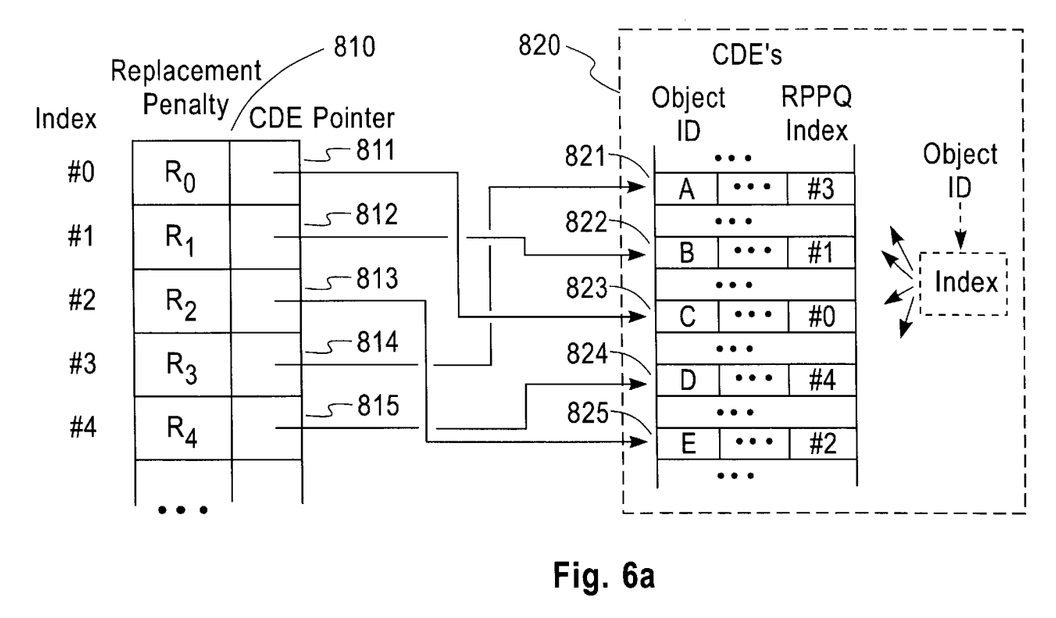
FIG. 6 depicts an example of a heap data structure used for the replacement penalty priority queue.
Figure 6B:
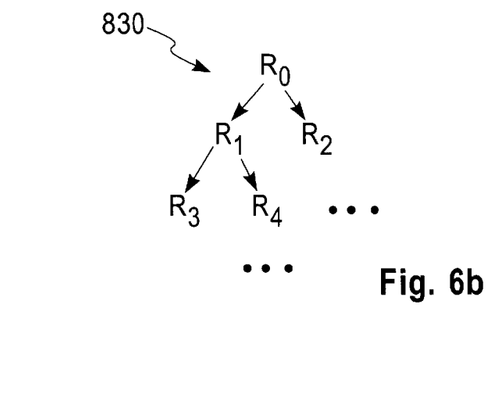

FIG. 6 depicts an example of an RPPQ 50 using a heap data structure. A heap is a standard data structure in which a complete binary tree is implemented using an array, and in which the minimum value in the heap is always found at the root of the logical binary tree, which corresponds to the first entry in the array. As depicted, the array 810 includes entries 811, 812, 813, 814, 815, and so on, each of which contains a replacement penalty Ri and a pointer to a corresponding cache directory entry (CDE) 821, 822, 823, 824, 825, and so on, in the cache directory 820, where each such pointer is to the CDE for the object for which the replacement penalty has been computed. The logical structure represented by the heap array 810 is illustrated by the binary tree 830, in which it is seen that the replacement penalty R0 at the first entry in the array is the minimum replacement penalty. Each CDE 821, 822, 823, 824, 825, and so on, contains an object identifier A, B, C, D, E, . . . ; and other information (not shown) such as the location of the object in the cache memory; and the index for the entry in the array 810 containing the replacement penalty for the object. For example, the CDE 821 for object A contains the index #3, and the entry 814 at index #3 in array 810 contains the replacement penalty R3 for object A and a pointer to the CDE 821 for object A; the CDE 822 for object B contains the index #1, and the entry 812 at index #1 in array 810 contains the replacement penalty R1 for object B and a pointer to the CDE 822 for object B; and so on. As entries are inserted or removed in the array 810, or moved due to changes in the computed replacement penalty, the indexes of entries will change. Each time the index of an entry in the array 810 is changed, the pointer to the CDE is used to find the CDE associated with the replacement penalty, and the new index is recorded in the associated CDE. Those skilled in the art will appreciate that a similar technique can be used when implementing the RPPQ using the alternatives mentioned above (e.g., Ronngren and Ayani); that is, regardless of the data structure used to implement the RPPQ, pointers from RPPQ entries to associated cache directory entries can be maintained, and these together with pointers or indexes to RPPQ entries from cache directory entries 821 . . . 825 allow efficient use of known priority queue data structures so as to find the object with the minimum replacement penalty. Selecting an object for replacement is now a matter of replacing the object 28 having the smallest replacement penalty R as recorded in the RPPQ structure 50. Periodically, the objects 28 in the RPPQ 50 can be re-evaluated to reflect changes in the performance statistics 45, e.g., availability, bandwidth, latency and possibly other statistics associated with the various storage repositories 20. As is conventional, this re-evaluation can be done incrementally by a background process that does not interfere with normal operation.

Those skilled in the art will appreciate that alternative and/or equivalent methods for estimating reference probabilities could be used within the spirit and scope of the present invention. For example, for each object j stored in the storage repository 20, the storage repository could return the fraction of the total requests F(1), received by that repository that were for object j. In addition, the number of references R to each storage repository 20 would be maintained. Using this alternative method, the reference probability P of an object j in storage repository i could be estimated as follows: Probability P (reference to object j in storage repository i)=F(j)×(R(i)/T) where P is the probability; F(j) is the fraction of the total requests received by storage repository i for object j; R(i) is the total number of references to storage repository i; and T is the total number of references to all storage repositories.

Figure 7:
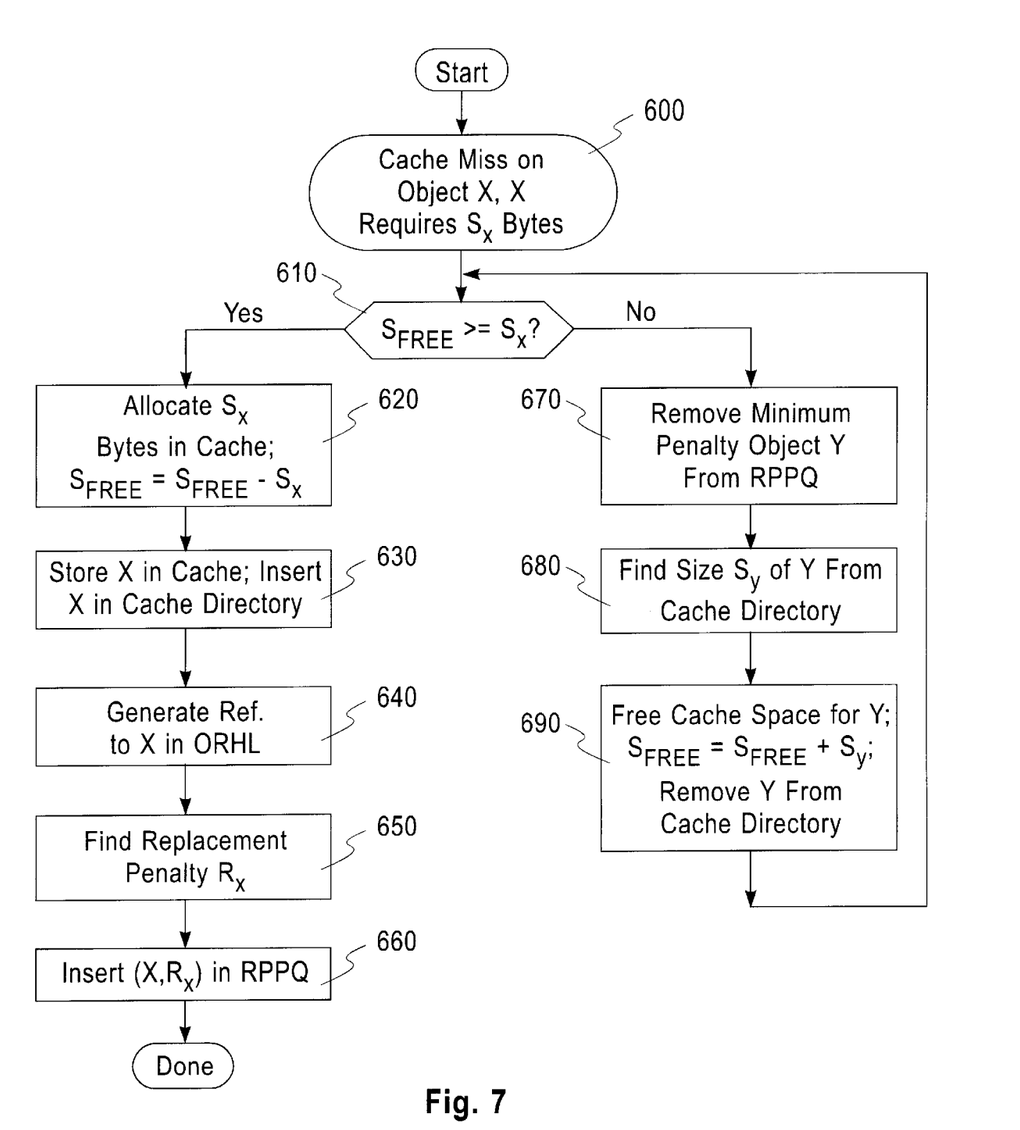
FIG. 7 depicts an example of a logic flow for handling a cache miss according to an embodiment of the present invention.

FIG. 7 depicts an example of a logic flow for handling a cache miss in accordance with the present invention. As depicted, in step 600 an application 60 requests an object X not currently in the cache 25. In step 610, the cache manager 30 determines if there is sufficient free space ($S_{Free}$) in the cache 25 to accommodate the object (which requires $S_X$ bytes). If there is sufficient free space, in step 620, space for the object X is allocated from the available free space. In step 630, the object is loaded into the cache 25 and an entry for the object is placed in the cache directory 35. In step 640, a reference to the object is placed at the head of the object reference history list (FIG. 3). In step 650, the replacement penalty R is calculated. In step 660, an entry for the object is inserted into the replacement penalty priority queue. If in step 610 it is determined that there is insufficient space to store the new object X in the cache 25, then in step 670, the object 28 having the minimum replacement penalty is removed from the replacement penalty priority queue (50). In step 680, the object's size $S_Y$ is determined from its cache directory 35 entry. In step 690, the object Y (having the minimum replacement penalty) is removed from the cache directory 35 and the amount of space $S_Y$ occupied by the object Y is added to the available free space ($S_{FREE}$). The process then iterates by returning to step 610.

Figure 8:
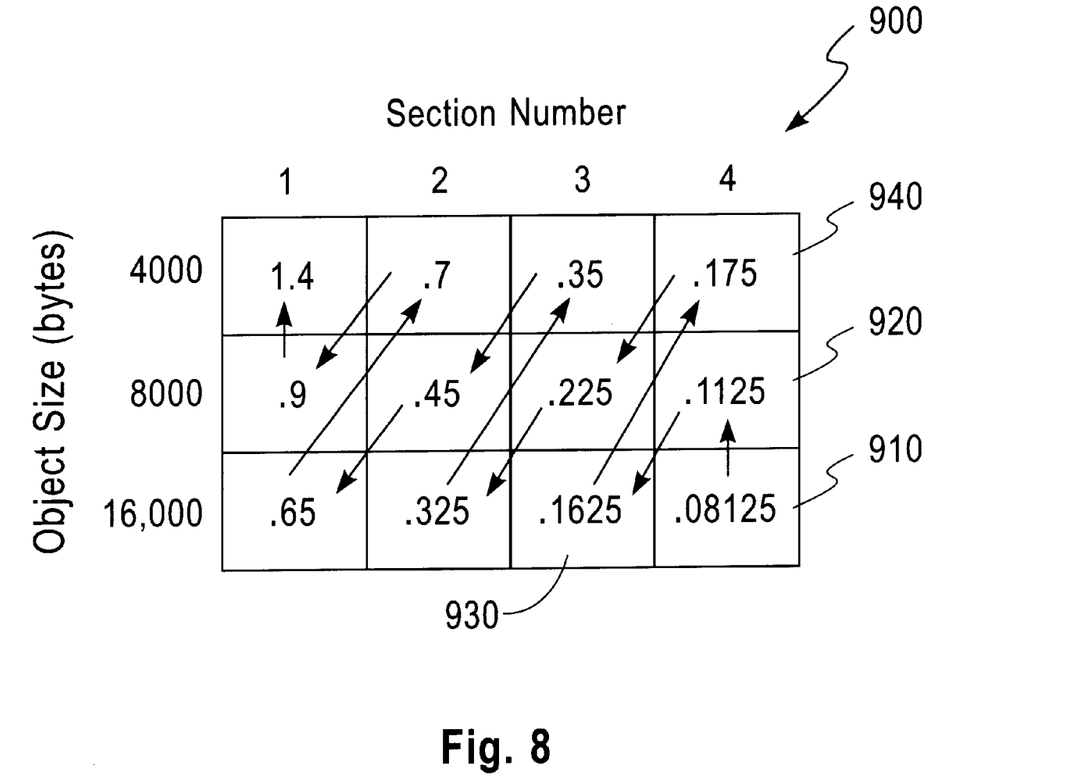
FIG. 8 depicts an example of an application using an ORHL in accordance with the present invention.

FIG. 8 depicts an example of an application of the present invention for a case in which there are three given object sizes, four sections in the ORHL (FIG. 3), and one storage repository. In this example the replacement penalty formula $R=P\times(L+S/B)/S$ given above will be used. As depicted, it is assumed that storage repository performance statistics have resulted in values L=10 ms (milliseconds), and B=1,000,000 bytes/second (for the given storage repository). Furthermore, it is assumed that object reference probability statistics have resulted in probability values P1=0.4 for the probability that an object in the first ORHL section will be referenced; P2=0.2 for the probability that an object in the second ORHL section will be referenced; P3=0.1 for the probability that an object in the third ORHL section will be referenced; and P4=0.05 for the probability that an object in the fourth ORL section will be referenced. Assuming that each section has an equal number of objects, the probability of referencing a given object is found by dividing by the number of objects in each section; however since all replacement penalties will be divided by the same constant factor this step can be omitted for illustrative purposes. Applying the replacement penalty formula with these values for three object sizes S of 4000, 8000, and 16,000 bytes, the values shown in table 900 are the resulting replacement penalties (in units of microseconds/byte). Selecting minimum replacement penalty objects to replace first, it is seen that first objects of size 16,000 bytes in Section 4 will be replaced (i.e., with the lowest replacement penalty 910); if there are no such objects, next objects of size 8000 bytes in Section will be replaced (with the next lowest replacement penalty 920); continuing in this fashion, next objects of size 16,000 bytes in Section 3 will be replaced (with the next lowest replacement penalty 930); next objects of size 4000 bytes in Section 4 will be replaced (with the next lowest replacement penalty 940); and so on; where the overall replacement ordering is indicated by a sequence of arrows (beginning with the object having the lowest replacement penalty 910). This example illustrates an overall replacement ordering for a single storage repository for three given object sizes at one given time; in general there will be multiple storage repositories with various time varying performance statistics; in some cases a large number of different object sizes; and the object reference probability statistics may also vary with time.

Now that the invention has been described by way of a preferred embodiment with alternatives, various equivalents, modifications and improvements will occur to those skilled in the art. Thus, it should be understood that the detailed description is provided as an example and not a limitation. The scope of the invention is properly defined by the appended claims.

We claim:

1. A computerized method for managing an object store based on replacement penalty comprising the steps of:

collecting one or more performance statistics about one or more storage repositories from which one or more objects can be retrieved;

retrieving an object from a storage repository, in response to an object reference;

determining a reference probability (P) for the object comprising the steps of:

associating and maintaining a least recently used (LRU) list of records corresponding to objects in the object store;

partitioning the LRU list into a number of sections;

inserting a record associated with a most recently referenced object at a head of the LRU list, in response to said storing step; and maintaining reference probability statistics for a set of objects in each section of the LRU list including incrementing a reference count N(i) for a section i if an object currently in said section i is referenced; wherein the reference probability (P) that an object in said section i will be referenced is P (reference to object in section i)–N(i)/(O(i)×T), wherein O(i) represents the number of objects in said section i, and T represents a total number of references for all sections;

determining and associating a replacement penalty (R) with the object, wherein the replacement penalty is based on the one or more performance statistics and the reference probability; and storing the object and an associated replacement penalty for the object.

2. The method of claim 1, wherein the object is stored in an object cache, further comprising the steps of:

receiving a new object reference to a new object, not in the object cache;

retrieving the new object from a storage repository, in response to the new object reference;

determining there is insufficient free space in the object cache for the new object; and replacing one or more objects in the object cache, a sum of sizes of which is equal to or greater than a size of the new object, based on the associated replacement penalty of one or more cached objects.

3. The method of claim 2, wherein said replacing step further comprises the steps of:

prioritizing the objects based on the associated replacement penalty of the one or more cached objects; and replacing the one or more cached objects having a minimum associated replacement penalty priority.

4. The method of claim 1, further comprising the step of recalculating the replacement penalty each time a change is made to a set of objects in any section of the LRU, based on the reference probabilities specific to said each section.

5. The method of claim 1 wherein the storage repositories are one of network sites and remotely attached devices, wherein said step of collecting performance statistics further comprises the step of collecting statistics for each storage repository accessed.

6. The method of claim 1, further comprising the steps of:

said step of determining a replacement penalty (R) is based on the reference probability (P) for the object and information selected from the group consisting of: an availability of the object (A); a size of the object (S), a latency associated with retrieving the object from a storage repository (L); or a bandwidth of the path to the storage repository (B).

7. The method of claim 6, further comprising the step of:

collecting usage statistics for one or more users who would be issuing one of stop and abort requests; and said step of determining a replacement penalty (R) is based on the usage statistics.

8. The method of claim 7, further comprising the steps of:

said step of collecting usage statistics includes the step of collecting statistics on time delays (D) associated with said one of stop and abort requests; and $$R=P\times((1-A)\times 1+A\times U(L+S/B))/S;$$

where said U has a maximum value of 1 and represents a user annoyance function indicating that an average time after issuing an object request that a given user issues an abort request and where said value of U increases linearly with D, up to the maximum value.

9. The method of claim 7, wherein the system includes a browser, further comprising the step of computing an annoyance function for a specific requester or set of requesters by instrumenting a browser STOP function and analyzing time interval statistics associated with usage of the STOP function.

10. The method of claim 1, wherein the object is stored in an object cache, further comprising the steps of:

receiving a new object reference to a new object, not in the object cache;

retrieving the new object from a storage repository, in response to the new object reference;

determining there is insufficient free space in the object cache for the new object; and reducing the resolution of one or more objects in the object cache, as a function of the replacement penalty for the objects in the object cache, until sufficient space is available to store the new object; and storing the new object and an associated replacement penalty for the new object, in response to said reducing.

11. The method of claim 1 wherein the storage repositories are locally attached devices, wherein said step of collecting performance statistics further comprises the step of collecting statistics for each local device accessed.

12. The method of claim 1 wherein the storage repositories are locally attached devices, wherein the performance statistics comprise known device performance characteristics.

13. A computerized method for managing an object store based on replacement penalty comprising the steps of:

collecting one or more performance statistics about one or more storage repositories from which one or more objects can be retrieved;

retrieving an object from a storage repository, in response to an object reference;

determining a reference probability (P) for the object comprising the steps of:

determining and associating a replacement penalty (R) with the object, wherein the replacement penalty is based on the reference probability (P) for the object and information selected from the group consisting of: an availability of the object (A); a size of the object (S), a latency associated with retrieving the object from a storage repository (L); or a bandwidth of the path to the storage repository (B);

wherein said step of determining a replacement penalty (R) is represented as a cost/benefit ratio $$R=P\times(L+S/B)/S;$$

where P×(L+S/B) represents an expected cost, in seconds of response time, for replacing the object; and S represents that the benefit of selecting the object for replacement is proportional to its size; and storing the object and an associated replacement penalty for the object.

14. A computerized method for managing an object store based on replacement penalty comprising the steps of:

collecting one or more performance statistics about one or more storage repositories from which one or more objects can be retrieved;

retrieving an object from a storage repository, in response to an object reference;

determining a reference probability (P) for the object comprising the steps of:

determining and associating a replacement penalty (R) with the object, wherein the replacement penalty is based on the reference probability (P) for the object and information selected from the group consisting of: an availability of the object (A); a size of the object (S), a latency associated with retrieving the object from a storage repository (L); or a bandwidth of the path to the storage repository (B);

wherein said step of determining a replacement penalty (R) is based on the availability of the object (A):

$$R=P\times((1-A)\times W+A\times(L+S/B)/S;$$

where W is an average waiting time before an unavailable storage repository becomes available; and storing the object and an associated replacement penalty for the object.

15. A computerized method for managing an object store based on replacement penalty comprising the steps of:

collecting one or more performance statistics about one or more storage repositories from which one or more objects can be retrieved;

estimating a reference probability (P) for said one or more objects wherein said estimating a reference probability comprises the steps of:

associating and maintaining a least recently used (LRU) list of records corresponding to objects in the object store;

partitioning the LRU list into a number of sections;

inserting a record associated with a most recently referenced object at a head of the LRU list, in response to said storing step; and maintaining object reference probability statistics for a set of objects in each section of the LRU list including incrementing a reference count N(i) for a section i if an object currently in said section i is referenced; wherein the reference probability (P) that an object in said section i will be referenced is P (reference to object in section i)=N(i)/(O(i)×T), wherein O(i) represents the number of objects in said section i, and T represents a total number of references for all sections;

receiving an object reference to an object not in the object store;

retrieving an object from a storage repository, in response to said receiving step;

determining there is insufficient free space in the object store for the new object; and replacing one or more objects in the object store, a sum of sizes of which is equal to or greater than a size of the new object, with the new object based on the associated replacement penalty of the one or more cached objects; wherein the replacement penalty is based on the one or more performance statistics and the reference probability.

16. A computer program product readable by a machine, tangibly embodying a program of instructions executable by the machine to perform method steps for managing an object store based on replacement penalty comprising the steps of:

collecting one or more performance statistics about one or more storage repositories from which one or more objects can be retrieved;

retrieving an object from a storage repository, in response to an object reference;

determining a reference probability (P) for the object comprising the steps of:

determining and associating a replacement penalty (R) with the object, wherein the replacement penalty is based on one or more performance statistics and the references probability; and wherein said determining further comprises the steps of:

associating and maintaining a least recently used (LRU) list of records corresponding to objects in the object store;

partitioning the LRU list into a number of sections;

inserting a record associated with a most recently referenced object at a head of the LRU list, in response to said storing step; and maintaining reference probability statistics for a set of objects in each section of the LRU list including incrementing a reference count N(i) for a section i if an object currently in said section i is referenced; wherein the reference probability (P) that an object in said section i will be referenced is P (reference to object in section i)–N(i)/(O(i)×T), wherein O(i) represents the number of objects in said section i, and T represents a total number of references for all sections; and storing the object and an associated replacement penalty for the object.

17. The computer program product of claim 16, wherein the object is stored in an object cache, further comprising the steps of:

receiving a new object reference to a new object, not in the object cache;

retrieving the new object from a storage repository, in response to the new object reference;

determining there is insufficient free space in the object cache for the new object; and replacing one or more objects in the object cache, a sum of sizes of which is equal to or greater than a size of the new object, based on the associated replacement penalty of one or more cached objects.

18. The computer program product of claim 16, wherein said replacing step further comprises the steps of:

prioritizing the objects based on the associated replacement penalty of the one or more caches objects; and replacing the one or more caches objects having a minimum associated replacement penalty priority.

19. The computer program product of claim 16, wherein said step of maintaining reference probability statistics further comprises the step of recalculating the replacement penalty each time a change is made to a set of objects in any section of the LRU, based on the reference probabilities specific to said each section.

20. The computer program product of claim 16, wherein the storage repositories are one of network sites and remotely attached devices, wherein said step of collecting performance statistics further comprises the step of collecting statistics for each storage repository accessed.

21. The computer program product of claim 16, wherein said step of determining a replacement penalty (R) is based on the reference probability (P) for the object and information selected from the group consisting of: an availability of the object (A); a size of the object (S); a latency associated with retrieving the object from a storage repository (L); or a bandwidth of the path to the storage repository (B).

22. The computer program product of claim 21, further comprising the step of:

collecting usage statistics for one or more users who would be issuing one of stop and abort requests; and said step of determining a replacement penalty (R) is based on the usage statistics.

23. The computer program product of claim 22, further comprising the steps of:

said step of collecting usage statistics includes the step of collecting statistics on time delays (D) associated with said one of stop and abort requests; and $$R=P\times((1-A)\times1+A\times U(L+S/B))/S;$$

where said U has a maximum value of 1 and represents a user annoyance function indicating that an average time after issuing an object request that a given user issues an abort request and where said value of U increases linearly with D, up to the maximum value.

24. The computer program product of claim 22, wherein the system includes a browser, further comprising the step of: computing an annoyance function for a specific requester or set of requesters by instrumenting a browser STOP function and analyzing time interval statistics associated with usage of the STOP function.

25. The computer program product of claim 16, wherein the object is stored in an object cache, further comprising the steps of:

receiving a new object reference to a new object, not in the object cache;

retrieving the new object from a storage repository, in response to the new object reference;

determining there is insufficient free space in the object cache for the new object; and reducing the resolution of one or more objects in the object cache, as a function of the replacement penalty for the objects in the object cache, until sufficient space is available to store the new object; and storing the new object and an associated replacement penalty for the new object, in response to said reducing.

26. The computer program product of claim 16 wherein the storage repositories are locally attached devices, wherein said step of collecting performance statistics further comprises the step of collecting statistics for each local device accessed.

27. The computer program product of claim 16 wherein the storage repositories are locally attached devices, wherein the performance statistics comprise known device performance characteristics.

28. A computer program product readable by a machine, tangibly embodying a program of instructions executable by the machine to perform method steps for managing an object store based on replacement penalty comprising the steps of:

collecting one or more performance statistics about one or more storage repositories from which one or more objects can be retrieved;

retrieving an object from a storage repository, in response to an object reference;

determining a reference probability (P) for the object comprising the steps of:
determining and associating a replacement penalty (R) with the object, wherein the replacement penalty is based on the reference probability (P) for the object and information selected from the group consisting of: an availability of the object (A); a size of the object (S), a latency associated with retrieving the object from a storage repository (L); or a bandwidth of the path to the storage repository (B);
wherein said step of determining a replacement penalty (R) is represented as a cost/benefit ratio $$R=P\times(L+S/B)/S;$$

where P×(L+S/B) represents an expected cost, in seconds of response time, for replacing the object; and S represents that the benefit of selecting the object for replacement is proportional to its size; and
storing the object and an associated replacement penalty for the object.

29. A computer program product readable by machine, tangibly embodying a program of instructions executable by the machine to perform method steps for managing an object store based on replacement penalty said method comprising the steps of:
collecting one or more performance statistics about one or more storage repositories from which one or more objects can be retrieved;
retrieving an object from a storage repository, in response to an object reference;
determining a reference probability (P) for the object comprising the steps of:
determining and associating a replacement penalty (R) with the object, wherein the replacement penalty is based on the reference probability (P) for the object and information selected from the group consisting of: an availability of the object (A); a size of the object (S), a latency associated with retrieving the object from a storage repository (L); or a bandwidth of the path to the storage repository (B);
wherein said step of determining a replacement penalty (R) is based on the availability of the object (A):

$$R=P\times((1-A)\times W+A\times(L+S/B)/S;$$

where W is an average waiting time before an unavailable storage repository becomes available; and
storing the object and an associated replacement penalty for the object.

30. A computer program product readable by machine, tangibly embodying a program of instructions readable by the machine to perform method steps for managing an object store based on replacement penalty said method steps comprising:
collecting one or more performance statistics about one or more storage repositories from which one or more objects can be retrieved;
estimating a reference probability (P) for said one or more objects wherein said estimating a reference probability comprises the steps of:
associating and maintaining a least recently used (LRU) list of records corresponding to objects in the object store;
partitioning the LRU list into a number of sections;
inserting a record associated with a most recently referenced object at a head of the LRU list, in response to said storing step; and
maintaining object reference probability statistics for a set of objects in each section of the LRU list including incrementing a reference count N(i) for a section i if an object currently in said section i is referenced;
wherein the reference probability (P) that an object in said section i will be referenced is P (reference to object in section i)–N(i)/(O(i)×T), wherein O(i) represents the number of objects in said section i, and T represents a total number of references for all sections;
receiving an object reference to an object not in the object store;
retrieving an object from a storage repository, in response to said receiving step;
determining there is insufficient free space in the object store for the new object; and
replacing one or more objects in the object store, a sum of sizes of which is equal to or greater than a size of the new object, with the new object based on the associated replacement penalty of the one or more cached objects; wherein the replacement penalty is based on the one or more performance statistics and the reference probability.

* * * * *